United States Patent [19]

Morton et al.

[11] 4,378,517

[45] Mar. 29, 1983

[54] METHOD AND APPARATUS FOR CONTROLLING THE ENERGIZATION OF AN ELECTRIC MOTOR

[75] Inventors: John Morton; John Jones, both of Romiley, England

[73] Assignee: Cableform Limited, Cheshire, England

[21] Appl. No.: 165,436

[22] Filed: Jul. 2, 1980

[30] Foreign Application Priority Data

Jul. 5, 1979 [GB] United Kingdom ............... 7923499

[51] Int. Cl.³ .............................................. H02P 5/16
[52] U.S. Cl. .................................... 318/338; 318/139; 318/341
[58] Field of Search .................... 318/139, 341, 338

[56] References Cited

U.S. PATENT DOCUMENTS

| | | | |
|---|---|---|---|
| 3,735,220 | 5/1973 | Ren ner et al. ................... | 318/341 |
| 3,841,238 | 10/1974 | Thompson ..................... | 318/341 |
| 4,037,144 | 7/1977 | Ohmae et al. .................. | 318/338 |
| 4,153,863 | 5/1979 | Schachte et al. ............... | 318/341 |
| 4,172,231 | 10/1979 | d'Alayer de Costemore d'Arc et al. ........................................ | 318/7 |
| 4,247,807 | 1/1981 | Wilson ........................... | 318/338 |

FOREIGN PATENT DOCUMENTS 663052 5/1979 U.S.S.R. .

*Primary Examiner*—David Smith, Jr.
*Attorney, Agent, or Firm*—Sughrue, Mion, Zinn, Macpeak and Seas

[57] ABSTRACT

To control the energization of an electric motor pulses of current are supplied to the motor from a power source, and the pulse mark/space ratio and the motor field strength are controlled to determine the output speed and torque of the motor. Means are provided for deriving information representative of the speed of the motor and the torque required to be developed by the motor at that speed, and means are provided for determining information representative of the pulse mark/space ratio and the motor field strength necessary to provide the required torque at the said derived speed such that power losses are minimized. This makes it possible to control the motor field strength and mark/space ratio in accordance with the determined information to achieve optimum efficiency.

6 Claims, 4 Drawing Figures

METHOD AND APPARATUS FOR CONTROLLING THE ENERGIZATION OF AN ELECTRIC MOTOR

The present invention relates to a method and apparatus for controlling the energisation of an electric motor.

It is known to supply power to an electric motor from a D.C. source such as a battery through an electronic switch such as a thyristor. The switch can be turned on and off at a high rate to apply pulses of current to the motor, the mark/space ratio of the pulses determining the acceleration and speed of the motor.

One known method for controlling a series D.C. traction motor is to vary the mark/space ratio and hence the effective voltage applied to the motor in response to an accelerator pedal generated demand signal representative of the desired motor acceleration. A maximum motor current or motor output power limiting system is often provided to avoid damage to the motor or components driven thereby. One such limiting system is described in our U.S. Pat. No. 3,914,671 which sets a maximum value for the mark/space ratio for a given value of motor current. The limiting system thus automatically prevents a mark/space ratio being selected which would result in the motor current exceeding permissible limits. Such a limiting system can be used with both series and shunt motors.

It is well known that the top speed of an electric series motor can be effectively increased by reducing the current through the field winding and thereby weakening the generated motor field. Conventionally this has been achieved by diverting a proportion of the armature current along a current path in parallel with the field winding. One such field weakening circuit is described in British Pat. No. 1,136,253.

Although as indicated above it has been known for a considerable time to provide control circuits in which the mark/space ratio and field strength are varied automatically to avoid motor overload or to increase motor speed, these control circuits have not directly interrelated the control of the mark/space ratio and field strength except in limiting conditions. As an example of such a limiting condition, in the circuit of British Pat. No. 1,136,253 field weakening occurs when the mark/space ratio reaches its maximum and a further increase in speed is demanded.

It is becoming increasingly important to improve the efficiency of electric systems, particularly those of motors driven by batteries. It has now been appreciated that power losses within such systems are dependent to an extent upon the relationship between the mark/space ratio and the field strength. This is because the power losses in the field increase relatively rapidly with increases in field strength, whereas power losses due to the battery and motor resistances decrease relatively gradually with increases in field strength. For a given motor power output requirement, a range of mark/space ratio versus field strength relationships can be selected. By selecting the relationship which minimises power losses the efficiency of the system can be increased.

According to the present invention there is provided a method for controlling the energisation of an electric motor, wherein pulses of current are supplied to the motor from a power source, the mark/space ratio of the pulses and the motor field strength being controlled to determine the output speed and torque of the motor, characterised in that information representative of the speed of the motor and the torque required to be developed by the motor at that speed is derived, information is determined which is representative of the motor field strength and the pulse mark/space ratio necessary to provide the required torque at said derived speed such that power losses are minimised, and the motor field strength and mark/space ratio are controlled in accordance with the determined information.

The invention also provides an apparatus for controlling the energisation of an electric motor, comprising means for supplying pulses of current to the motor from a power source, and means for controlling the pulse mark/space ratio and the motor field strength to determine the output speed and torque of the motor, characterised in that means are provided for deriving information representative of the speed of the motor and the torque required to be developed by the motor at that speed, and means are provided for determining information representative of the pulse mark/space ratio and the motor field strength necessary to provide the required torque at the said derived speed such that power losses are minimised, said controlling means being operative to control the motor field strength and mark/space ratio in accordance with the determined information.

Preferably the motor speed and torque requirement are monitored at predetermined intervals to enable periodic adjustment of the mark/space ratio and field strength. A microprocessor may be provided to determine the most efficient mark/space ratio versus field strength relationship. The microprocessor may be programmed to calculate the necessary information from the derived motor speed and torque information and from the known characteristics of the motor. Alternatively, the microprocessor may be programmed to read out previously calculated information stored in a memory, each memory address corresponding to a particular motor speed and torque requirement.

An embodiment of the invention will now be described by way of example with reference to the accompanying drawings, in which.

Figure 1:
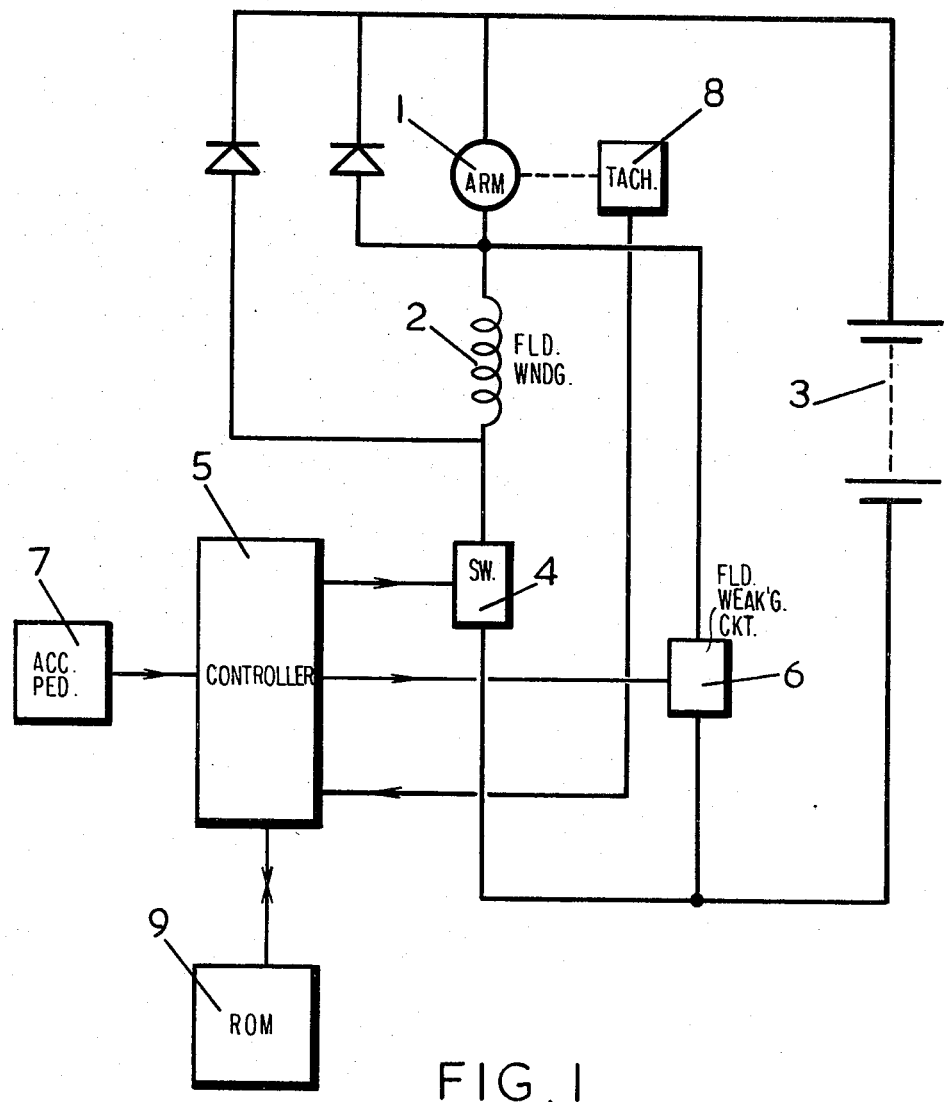
FIG. 1 is a schematic diagram of a control circuit for a series electric motor embodying the invention.

Referring to FIG. 1, the illustrated circuit comprises a series motor having an armature 1 and a field winding 2 connected across a battery 3. A D.C. switch 4 in series with the motor is controlled so as to be either on or off by pulses from a controller 5. A field weakening circuit 6 is controllable by controller 5 to divert current passing through the motor armature away from the field 2.

The Controller 5 is responsive to the output of an operator controlled accelerator pedal 7, the output of which effectively demands a motor output torque which decreases with increasing speed, and to the output of a tachometer 8. The controller 5 is also connected to a programmable read only memory 9, as is described below.

Knowledge of the motor speed makes it possible to determine the motor torque. The controller 5 determines the field strength and the mark/space ratio.

The memory 9 contains pre-calculated information relating to the most efficient mark/space ratio versus field strength relationships for various motor speeds and torque demands. The derivation of this information is described below. For example, the accelerator 7 can be arranged to provide any one of ten demand signals dependent upon the pedal position, and the motor speed can be divided into ten ranges. The memory will then be provided with one hundred addresses, each corresponding to one pedal position/speed range condition.

The controller 5 comprises a microprocessor which determines which of the ten blocks of memory is being indicated by the accelerator panel. The microprocessor is effective periodically to measure the motor speed from the output detector 8 and to extract the information contained in the memory address specific to the determined speed and torque requirement, and to control the switch 4 and field weakening circuit 6 in accordance with the extracted information.

Figure 2:
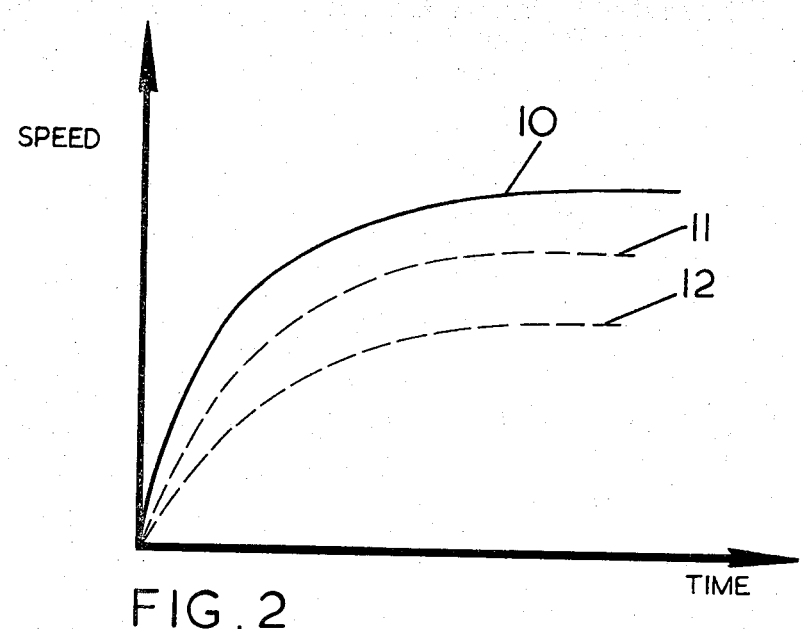
FIG. 2 shows curves representative of the variation with respect to time of the speed of the motor of FIG. 1 for a series of different accelerator pedal settings.

Referring now to FIG. 2, a speed versus time graph is given for the motor of FIG. 1. The full line 10 indicates the performance of the motor from rest with a first constant accelerator output, broken lines 11 and 12 showing the performance for two different accelerator pedal outputs. The gradient of the curves represents acceleration. Obviously in practice the accelerator pedal will often be moved during a driving sequence but at any given instant if the speed and pedal setting are known the acceleration requirement can be deduced from the gradient of the curve corresponding to the pedal position at that speed. Thus the output of the accelerator pedal represents a demanded acceleration or motor output power P which is equal to torque T multiplied by speed S.

i.e. $P = TS$ (1)

The power output is equal to the motor armature current Ia multiplied by armature voltage Va. Va is equal to the fixed battery voltage Vb multiplied by the mark/space ratio D.

i.e. $DV_b I_a = TS$ (2)

For a given accelerator pedal position and speed TS must be a constant as otherwise the motor would not meet its performance requirements. Thus:

$Vb \, DI_a = $ constant (3)

D can be varied by suitable control of the switch 4. Ia can be varied by suitable control of the field weakening circuit 6. Thus the switch 4 and circuit 6 can be controlled to obtain maximum efficiency whilst maintaining the desired motor performance.

Power losses P due to the battery resistance $R_b$ and motor resistance $R_m$ are proportional to current squared. Current flows through the motor continuously via the free-wheel diode shown in FIG. 1 but only flows through the battery when the switch 4 is on. Thus:

$P_r = I_a^2 (R_m + DR_b)$ (4)

Power losses $P_f$ due to the motor field are dependent upon motor constants but to a first approximation are proportional to ampere turns A squared. Thus:

$P_f = $ (constant) $A^2$ (5)

The value of expression (5) increases relatively rapidly with increases in field current for a fixed power output. The value of expression (4) decreases rapidly until saturation is reached: it then decreases relatively slowly with increases in field current for a fixed power output.

Figure 3:
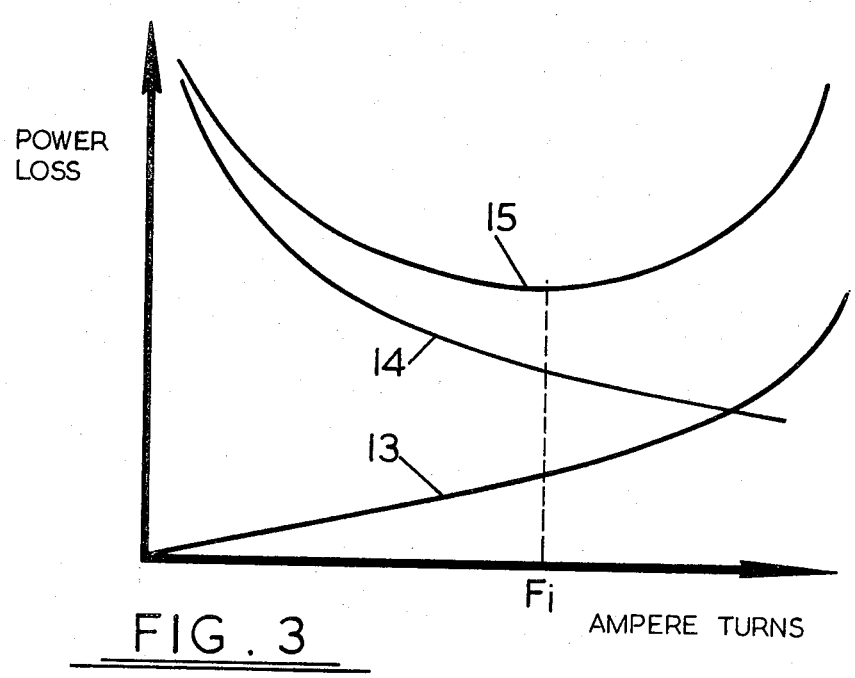
FIG. 3 shows curves representative of the variation with respect to field strength of power losses for the motor of FIG. 1 resulting from various factors.

Referring to FIG. 3, curves 13 and 14 respectively illustrate the variation with respect to field strength expressed as ampere turns of power losses due to the motor field and due to the battery and motor resistances for a given demanded power output and speed. Curve 15 represents the sum of curves 13 and 14.

It will be seen that curve 15 defines a minimum power loss at an intermediate field strength $F_i$. Accordingly for the demanded power output and speed the field strength should be set at $F_i$ and the mark/space ratio set at the level $D_s$ appropriate to the demanded power output. Thus, referring again to FIG. 1, the memory address relating to the speed and power output to which FIG. 3 relates should contain the information: set field strength at $F_i$, and mark/space ratio at $D_s$. The controller will then use this information to provide the desired maximum operating efficiency.

Figure 4:
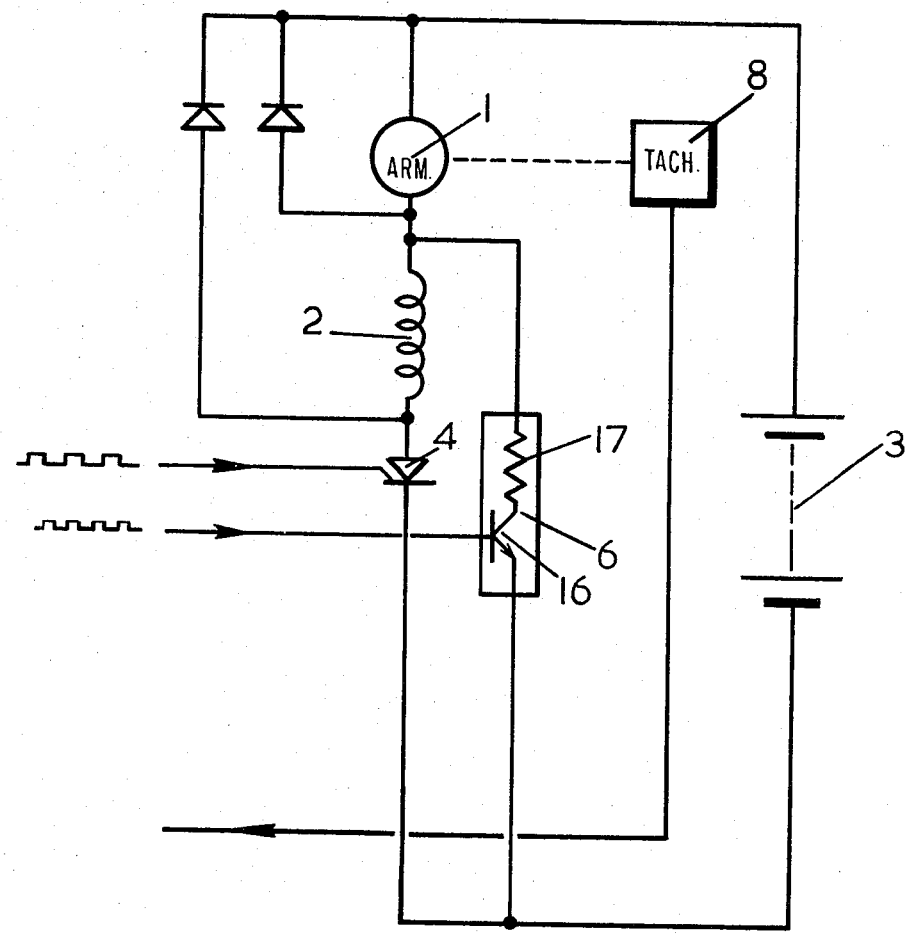
FIG. 4 schematically illustrates a field weakening circuit which may be used in embodiments of the invention.

Referring now to FIG. 4, a further diagram of a portion of the circuit of FIG. 1 is shown with components 4 and 6 being illustrated in greater detail.

The switch 4 comprises a thyristor (SCR) the gate of which receives control pulses in known manner. The gate pulse generating circuit could be of the type described in U.S. Pat. No. 3,914,671 for example.

The field weakening circuit comprises a transistor 16 in series with a resistor 17. The base of the transistor receives a series of pulses such that the transistor is alternately switched fully on and fully off. The mean impedance of the field weakening circuit defined by transistor 16 and resistor 17 can be controlled down to a minimum defined by the resistance of resistor 17 by controlling the mark/space ratio of the pulses applied to the base of transistor 16.

In the abovedescribed embodiment, the system operates by measuring the speed, considering the speed versus time curve set by the position to which the first pedal has been depressed, determining the torque appropriate to the speed and pedal position from that curve, and then selecting the appropriate mark/space ratio and field strength. Other schemes of operation are of course possible. For example, it is possible to directly measure torque, consider a torque versus time curve selected by the position to which the first pedal has been depressed, (the integral of this curve being equal to speed), determine the speed from the curve, and then select the appropriate mark/space ratio and field strength.

The described embodiment of the invention comprises a series motor in which a circuit is provided for controlling the field strength by diverting current away from the series field and for controlling the armature current by adjusting the mark/space ratio of current pulses applied to the motor. The invention is however also applicable to shunt motors in which the field winding is separately excited, the armature and field currents being separately controlled by respective circuits for controlling the mark/space ratio of current pulses supplied to them. In addition, the invention is applicable to compound motors which comprise both series and separately excited field windings. In the case of compound motors field control may be effected simply by appropriate control of the separately excited windings and it is thought that such an arrangement will prove to be the most efficient.

What is claimed is:

1. A method for controlling the energisation of an electric motor, wherein pulses of current are supplied to the motor from a power source, and both the mark/space ratio of the pulses and the motor field strength are controlled to determine the output speed and torque of the motor, comprising the steps of:
    (a) sensing the speed of the motor,
    (b) sensing the torque desired to be developed by the motor at said sensed speed,
    (c) determining both the motor field strength and the pulse mark/space ratio necessary to provide the desired torque at said sensed speed such that both power source and motor power losses are minimised, and
    (d) controlling both the motor field strength and the pulse mark/space ratio in accordance with the determined information.

2. An apparatus for controlling the energisation of an electric motor, including means for supplying pulses of current to the motor from a power source, and means for controlling both the pulse mark/space ratio and the motor field strength to determine the output speed and torque of the motor, comprising:
    (a) means for sensing the speed of the motor,
    (b) means for sensing the torque desired to be developed by the motor at said sensed speed,
    (c) means for determining both the pulse mark/space ratio and the motor field strength necessary to provide the desired torque at said sensed speed such that both motor and power source power losses are minimised, and
    (d) means for operating said controlling means to control both the motor field strength and the pulse mark/space ratio in accordance with the determined information.

3. An apparatus according to claim 2, comprising means for monitoring the motor speed and desired torque at predetermined intervals, and means responsive to the monitoring means for periodically adjusting the pulse mark/space ratio and the field strength.

4. An apparatus according to claim 2 or 3, comprising a microprocessor for determining the most efficient mark/space ratio versus field strength relationship.

5. An apparatus according to claim 4, wherein the microprocessor is programmed to calculate the necessary information from the sensed motor speed and desired torque and from predetermined characteristics of the motor.

6. An apparatus according to claim 4, wherein the microprocessor is programmed to read out previously calculated information stored in a memory, each address of said memory corresponding to a particular motor speed and torque requirement.

* * * * *